United States Patent
Yu et al.

(10) Patent No.: US 11,552,537 B2
(45) Date of Patent: Jan. 10, 2023

(54) METHOD FOR REDUCING BEARING CURRENT IN ELECTRIC SUBMERSIBLE MOTORS

(71) Applicant: RLT HOLDINGS, LLC, Missouri City, TX (US)

(72) Inventors: Zhichao Yu, Houston, TX (US); Kyle Meier, Houston, TX (US); Edward Curt, Houston, TX (US)

(73) Assignee: RLT Holdings, LLC, Missouri City, TX (US)

( * ) Notice: Subject to any disclaimer, the term of this patent is extended or adjusted under 35 U.S.C. 154(b) by 0 days.

(21) Appl. No.: 17/409,953

(22) Filed: Aug. 24, 2021

(65) Prior Publication Data

US 2022/0069678 A1    Mar. 3, 2022

Related U.S. Application Data

(60) Provisional application No. 63/071,799, filed on Aug. 28, 2020.

(51) Int. Cl.
| H02K 11/40 | (2016.01) |
| H02K 5/173 | (2006.01) |
| F04D 13/10 | (2006.01) |
| H02K 1/18 | (2006.01) |
| H02K 5/14 | (2006.01) |
| H02K 1/278 | (2022.01) |

(52) U.S. Cl.
CPC ............ *H02K 11/40* (2016.01); *F04D 13/10* (2013.01); *H02K 1/18* (2013.01); *H02K 1/278* (2013.01); *H02K 5/14* (2013.01); *H02K 5/1737* (2013.01)

(58) Field of Classification Search
CPC .... F04D 13/086; F04D 13/10; F04D 15/0077; H02K 1/18; H02K 1/278; H02K 11/40; H02K 5/132; H02K 5/14; H02K 5/1737; H02K 7/08
See application file for complete search history.

(56) References Cited

U.S. PATENT DOCUMENTS

| 2013/0099624 A1* | 4/2013 | Vicars | H01R 39/64 310/232 |
| 2014/0191630 A1* | 7/2014 | Orlowski | H01R 39/64 310/68 R |
| 2016/0372987 A1* | 12/2016 | Tejano | H02K 11/40 |

FOREIGN PATENT DOCUMENTS

| CA | 2877135 A1 * | 12/2013 | ........... F16J 15/4478 |
| WO | WO-2013192169 A1 * | 12/2013 | ........... F16J 15/4478 |

* cited by examiner

*Primary Examiner* — Naishadh N Desai
(74) *Attorney, Agent, or Firm* — Ditthavong, Steiner & Mlotkowski

(57) ABSTRACT

Embodiments disclosed herein describe methods for an improved electrical connector system.

20 Claims, 3 Drawing Sheets

METHOD FOR REDUCING BEARING CURRENT IN ELECTRIC SUBMERSIBLE MOTORS

BACKGROUND INFORMATION

Field of the Disclosure

Examples of the present disclosure relate to systems and methods for an electric submersible pump(ESP). More specifically, embodiments relate to a grounding system for use in ESP motors.

Background

Hydraulic fracturing is the process of creating cracks or fractures in underground geological formations. After creating the cracks or fractures, a mixture of water, sand, and other chemical additives are pumped into the cracks or fractures to protect the integrity of the geological formation and enhance production of the natural resources. The cracks or fractures are opened by the mixture, allowing the natural resources within the geological formation to flow into a wellbore, and then it is collected at the surface.

Artificial lift is a process utilized to increase the pressure within the wellbore to move the natural resources within the geological formation to the surface. When the natural drive energy of the reservoir is not strong enough to push the oil to the surface, artificial lift is employed to recover more of the natural resources at the surface.

Conventionally, to create artificial lift systems, a centrifugal pump is positioned below an isolate zone, wherein the centrifugal pump is connected to a long electric motor. To power the system, a long power cable is employed to convey electricity to the downhole electric motor of the electric lift system. This long power cable is typically comprised of a larger sized power cable section spliced together with a smaller and shorter cable called a motor lead extension (MLE). The MLE is smaller than the longer power cable to allow easier passage in between the downhole pump system and inner diameter of the casing.

To operate the pump system, a Variable Frequency Drive (VFD) is installed at the surface. For typical ESP installations, the VFD is connected to a low voltage power source from a utility. The VFD provides the necessary power output needed to operate the downhole motor and spin the pumps. The VFD can alter the frequency of the output and control the rotation rate of the motor and thus the pumps to produce varying levels of production from the wells. Voltage spikes and electrical harmonics may develop during operation which can cause harm to the downhole motor. An output filter after the VFD can smooth these signals out and minimize these negative effects.

However, even with current methods of minimizing voltage spikes and harmonics, there may still be issues in the downhole system resulting from voltage potentials being created between the rotating assembly and static components. In a typical downhole motor, the rotor and shaft system rotate relative to the stator and housing. The rotor and shaft system are supported by a multitude of bearing assemblies typically plain journal bearings. These bearings utilize a thin film of hydraulic oil to support the loads of the rotating system. This thin film may act as an insulator since hydraulic oil system of downhole motors is purposefully made to have very high dielectric properties. With the VFD operating the downhole motor, voltage potential may develop between the rotor system and the stator. This potential grows to a point where it is large enough to produce an electric arc breaking down the thin film of the hydraulic oil in the plain journal bearings, which may result in electrical currents being conducted through the motor bearings. This small electric arc may occur thousands of times and create damaging pitting and scoring of the bearing materials. This ultimately leads to catastrophic failure of the downhole motor and requires the system to be pulled from the well with a costly workover.

Accordingly, needs exist for systems and methods for ways to handle and to minimize the current conducted across bearings in a downhole motor to increase downhole reliability.

SUMMARY

Embodiments disclosed herein are directed towards reducing a bearing current with a grounding ring, which may be installed on a lower end of the motor. The grounding ring may be configured to positively ground a rotor system. This may reduce conventional current that conducted between the rotor system and stator through the motor bearings. By positioning a grounding ring below the bearings, a preferred current flow path to ground may be created, where the current does not flow through the bearings.

Embodiments may include a stator windings, shaft, base, bearings, grounding ring, and retaining nut.

The stator windings may be a plurality of stator copper windings, which are positioned in stacked laminations. The stacked laminations may be configured to encompass the shaft within a housing, wherein the housing couples a head to the base of the permanent magnet motor system. The stator windings may be a stationary part of a rotary system. The stator windings may be configured to provide a magnetic field that drives the shaft and rotates the bearings, wherein the stator windings produce a rotating magnetic field.

The shaft may be unitary piece of material forming a rotor that is a moving component of the permanent magnet rotor system. The shaft may have a proximal end that extends past upper bearings, and a distal end that extends past the lower bearings to allow an attachment of a load or additional rotor systems in series. By coupling a plurality of rotor systems in series, torque across the multiple rotors may be transferred to each other. Furthermore, the distal end of the shaft may be configured to be a lower bearing seat, wherein the distal end of the shaft may receive the lower bearings, grounding ring, and retaining nut. The lower bearing seat may include a first shoulder and first threads. In embodiments, the first shoulder may be configured to decrease an outer diameter of the shaft to form the distal end, wherein the rotating portion of the bearings are configured to be positioned adjacent to and under the first shoulder. The first threads may be configured to allowing the retaining nut to be secured to the distal end of the shaft.

The base may be a bottom adapter being coupled to the housing, and be configured to secure the bearings, grounding ring, and retaining nut in place. The base may include a second shoulder that is configured to decrease an inner diameter across the base. In embodiments, a stationary portion of the bearings may be configured to be positioned adjacent to and under the second shoulder.

The bearings may be rolling element style bearings with rotating elements and a stationary component. The bearings may be configured to reduce rotational friction while supporting radial and axial loads. The bearings may be positioned between the end of the shaft and the ends of the stator windings to allow for the bearings to be positioned in a lower temperature environment than other portions of a motor, wherein the bearings are positioned outside of the stator windings. The bearings may include a thin film of hydraulic oil that supports the loads of the rotating system, wherein the thin film acts as an insulator. In use, a voltage potential may develop between the bearings and the stator, wherein this voltage potential may create an electrical arc breaking down the thin film if an additional current flow path is not available.

The grounding ring may be a device that is configured to suppress electrical interference, reduce electrical noise, and provide reliable shaft grounding for the permanent magnet motor system. Specifically, the grounding ring may be configured to protect the bearings from destructive shaft voltages and current produced by variable frequency drives (VFDs) by providing an alternative flow path for this current. The grounding ring may be configured to be positioned directly under and adjacent to the bearings, and have an inner diameter positioned adjacent to the outer diameter of the shaft. This may maximize or increase the surface area of the grounding ring to the shaft and bearings.

The retention nut may be configured to be positioned around the grounding ring. The retention nut may have external threads that are configured to interface with internal threads on the base.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
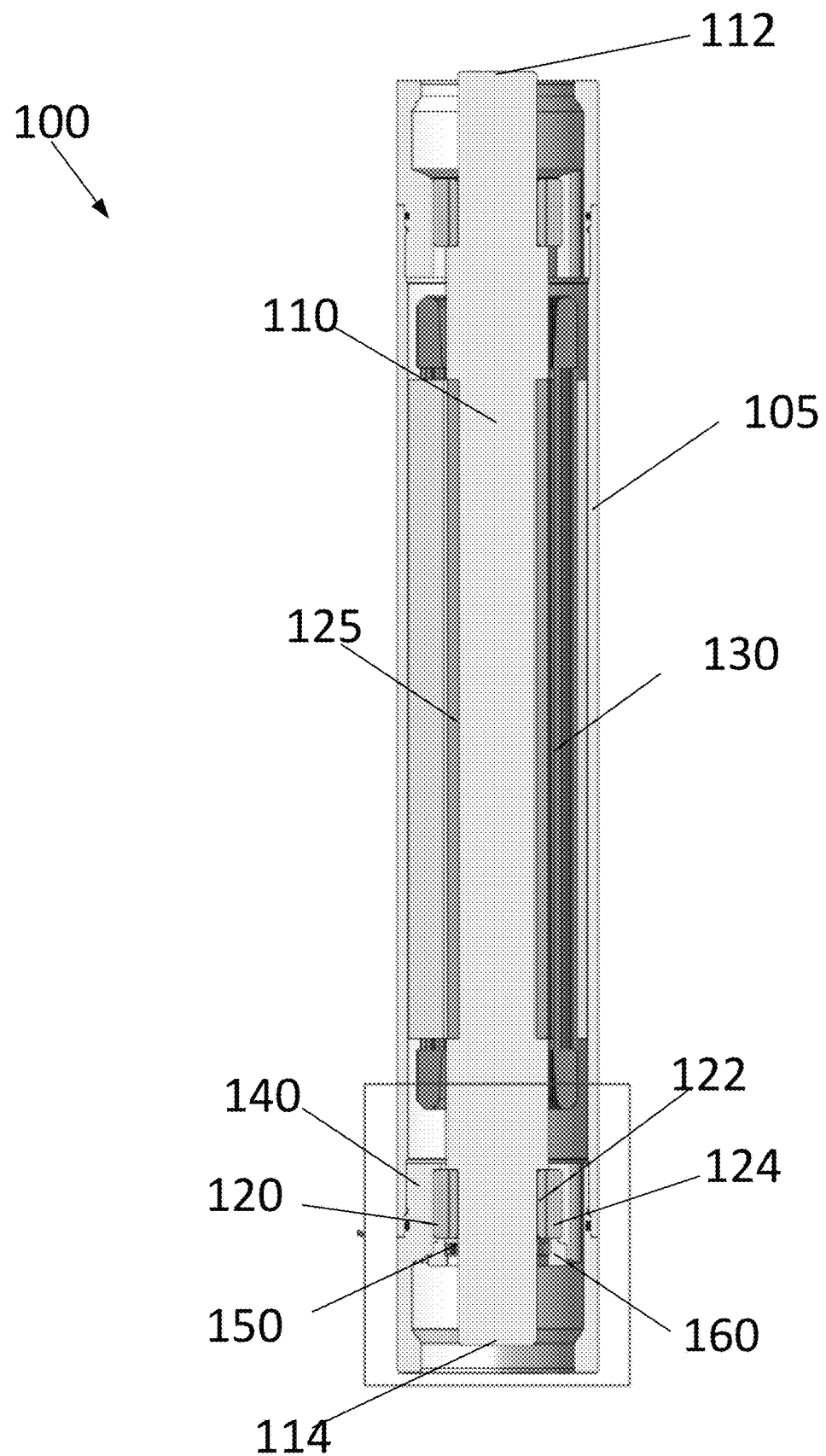
FIG. 1 depicts a downhole tool to reduce voltage potential buildup associated with a permanent magnet motor system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a downhole tool to reduce voltage potential buildup associated with a permanent magnet motor system 100, according to an embodiment. Permanent magnet motor system 100 may include a housing 105, shaft 110, bearings 120, permanent magnets 125, stator 130, base 140, grounding ring 150, and retaining nut 160.

Housing 105 may be a device that is to be coupled with a head and base 150 of permanent magnet motor system 100. Housing 105 may be configured to protect the elements of permanent magnet motor system 100, which may be positioned within housing 105. Housing 105 may be a stationary element of permanent magnet motor system 100, which may be configured to remain static while shaft 110 rotates.

Shaft 110 may be a rotor that is a moving component of permanent magnet rotor system 100.

Shaft 110 may include a proximal end 112 that extends past the upper bearings, and a distal end 114 that extends past lower bearings 120. Proximal end 112 and distal end 114 may be configured to allow an attachment of a load or additional permanent magnet rotor systems 100 in series. By coupling a plurality of permanent magnet rotor systems 100 in series, torque across the multiple systems may be transferred to each other, such that the power of the plurality of permanent magnet rotor systems 100 may be customized and amplified. The rotation of shaft 110 may be assisted via upper bearings and lower bearings 120.

Bearings 120 may be rolling element style bearings with rotating elements 122 and a stationary component 124. Bearings 120 may be configured to reduce rotational friction while supporting radial and axial loads. Bearings 120 may be positioned between the end of the shaft 110 and the ends of the stator 130 to allow for the bearings 120 to be positioned in a lower temperature environment than other portions of the motor, wherein the bearings 120 are positioned outside of the stator windings. Bearings 120 may include a thin film of hydraulic oil that supports the loads of the rotating system, wherein the thin film acts as an insulator. In use, a voltage potential may develop between rotating bearings 120 and the stator 130, wherein this voltage potential may create an electrical arc breaking down the thin film if an additional current flow path is not available.

Permanent magnets 125 may be materials where a magnetic field is generated by the internal structure of the material itself. Permanent magnets 125 may include north magnet stacks and south magnet stacks, with the same or different number of north magnet stacks and south magnet stacks. The positioning of the permanent magnets 125 allows the permanent magnet rotor system 100 to locate the permanent magnets 125 between the bearings to increase the power density, performance, torque, and torsional rigidity of permanent magnet rotor system 100.

Stator 130 may be a stationary part of permanent magnet motor system 100 that is configured to generate a field that interacts with the permanent magnets 125.

Base 140 may be a bottom adapter being coupled to the housing 105, and be configured to secure bearings 120, grounding ring 150, and retaining nut 160 in place.

Grounding ring 150 may be a device that is configured to suppress electrical interference, reduce electrical noise, and provide reliable shaft grounding for the permanent magnet motor system 100. Specifically, grounding ring 150 may be configured to protect the bearings 120 from destructive shaft voltages and current produced by improper or poor grounding methods and variable frequency drives (VFDs) by providing an alternative flow path for current and minimizing voltage potential differences. Grounding ring 150 may be configured to be positioned directly under and adjacent to the bearings 120, and have an inner diameter positioned adjacent to the outer diameter of the shaft 110. Furthermore, the inner circumference of grounding ring 150 may be substantially the same size as the outer diameter of shaft 110. This may maximize or increase the surface area of the grounding ring 150 to the shaft 110 and bearings 120. Furthermore, a low profile system with minimal downhole real estate is created to implement a preferred flow path of current associated with voltage potential between shaft 110 and stator 130 by having the circumferences of grounding ring 150 and bearings 120 being substantially the same size.

Retention nut 160 may be configured to be positioned around grounding ring 150. Retention nut 160 may have external threads that are configured to interface with internal threads on base 140. These threads may be configured to secure retention nut 160 within base 140, and may enable retention nut 160 to maintain the grounding ring 150 in place against the bearings 120.

Figure 2:
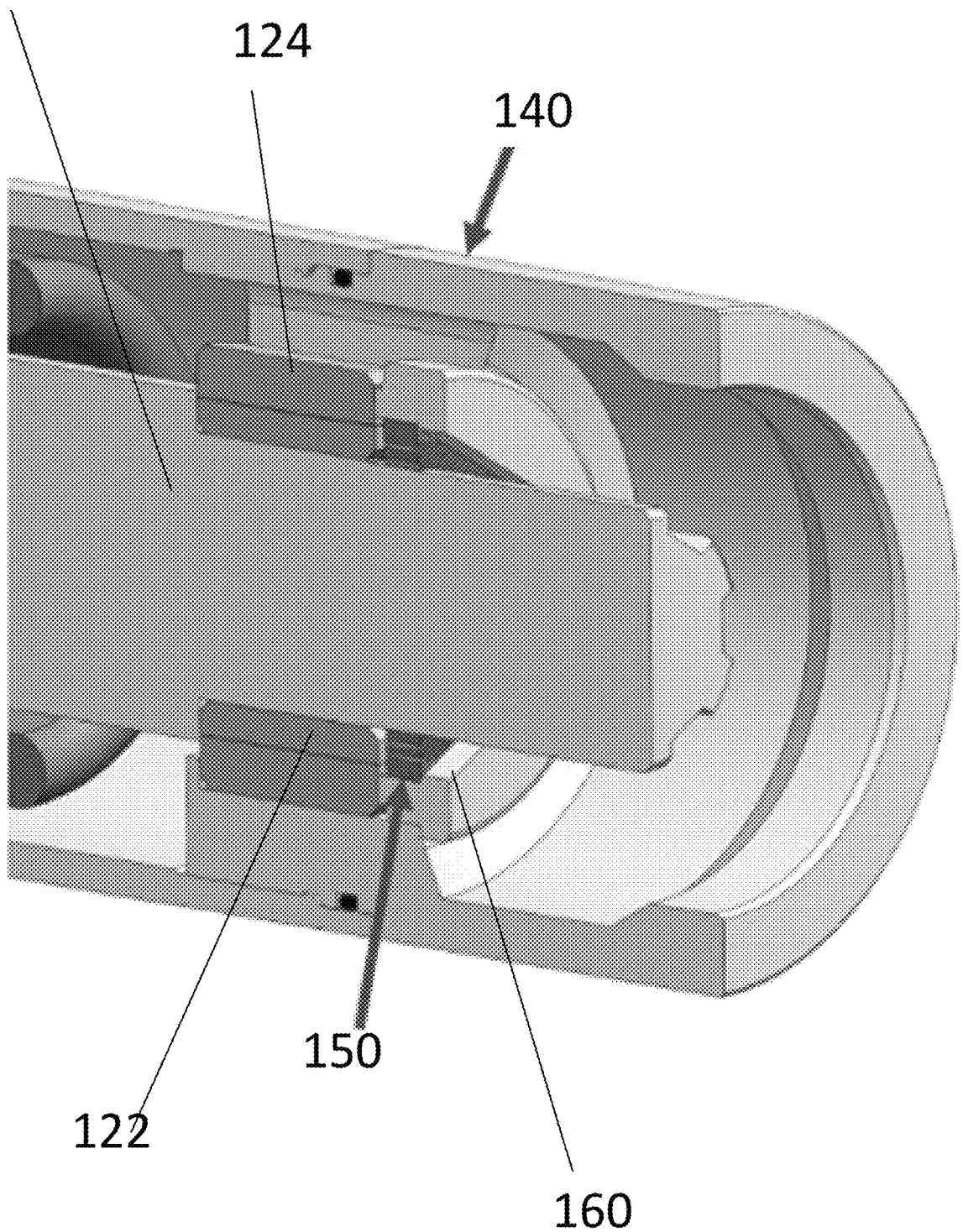
FIG. 2 depicts a bottom adapter, according to an embodiment.

FIG. 2 depicts a base 140 of a permanent magnet motor system, according to an embodiment. Elements depicted in FIG. 2 may be described above, and for the sake of brevity a further description of these elements is omitted.

Bearings 120 may include a rotating portion 122 and a stationary portion 124. The rotating portion 122 may be an inner ring positioned on the circumference of stationary portion, wherein the rotating portion 122 is configured to rotate while the stationary portion 124 is a stationary outer ring. The rotating portion 122 may be configured to be positioned adjacent to an outer diameter of shaft 110. This positioning may allow the rotating portion 122 of bearings 120 to constrain the relative motion of shaft 110, while reducing friction between bearings 120 and shaft 110.

Shaft 110 may also include a first shoulder 220, wherein first shoulder 220 may to extend towards a central axis of shaft 110 to decrease an outer diameter of shaft. First shoulder 220 may be configured to be positioned over and adjacent to rotating portion 122 of bearings 120, which may restrict the linear motion of bearings 120 in a first direction.

Base 140 may include a second shoulder 230 that away from the central axis of shaft 110, which may increase an inner diameter across base 140. Second shoulder 230 may be configured to be positioned over and adjacent to stationary portion 124 of bearings 120. This may restrict the linear motion of bearings 120 in the first direction.

Retention nut 160 may be configured to be positioned around the grounding ring 150, and restrict the movement of grounding ring 150 and bearings in a second direction. In embodiments, retention nut 160 may be substantially aligned with the stationary portion 124 of bearings 120 and grounding ring 122 may be substantially aligned with the rotating portion 122 of bearings.

Figure 3:
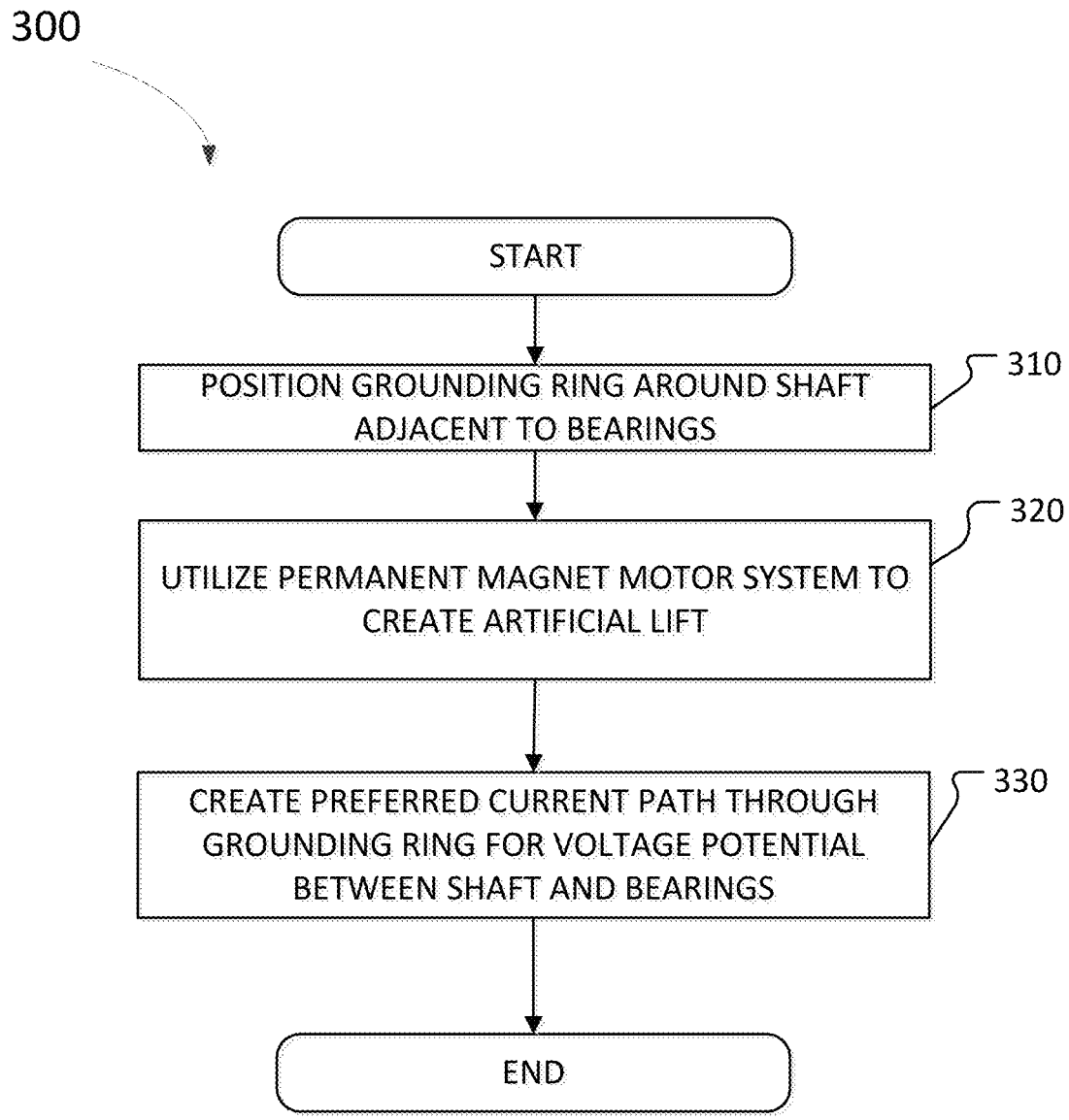
FIG. 3 depicts a method to reduce voltage potential buildup associated with a permanent magnet motor system, according to an embodiment.

FIG. 3 depicts a method 300 for improved electrical grounding system, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

At operation 310, bearings, a grounding ring, and a retention nut may be coupled to a lower bearing seat portion of a shaft. In embodiments, the lower bearing seat portion may be positioned below the stator of a permanent magnet motor system. This may position the grounding ring on a lower end of the motor while positively grounding the rotor system.

At operation 320, the permanent magnet motor system may be operating to create artificial lift within a wellbore. The permanent magnet motor system may utilize a VFD, where a voltage potential may grow between the stator and the shaft.

At operation 330, the grounding ring positioned below the bearings may limit the voltage potential buildup, which limits destructive current conducted between the shaft and the stator through the motor bearings. Specifically, the grounding ring provides a more preferred path for current associated with the voltage potential to drain through.

What is claimed is:

1. A permanent magnet motor system, comprising:
    a shaft with a proximal end and a distal end, wherein permanent magnets are positioned on an outer circumference of the shaft;
    a stator positioned around the shaft;
    bearings positioned around a distal end of the shaft, the bearings positioned between the stator and a distalmost end of the shaft;
    a grounding ring positioned adjacent to the bearings; and
    a retention nut positioned adjacent to the grounding ring, wherein the grounding ring is configured to provide a preferred current flow path associated with a voltage potential between the stator and the shaft.

2. The system of claim 1, wherein the current flow path does not flow through the bearings.

3. The system of claim 1, wherein an inner circumference of the grounding ring is in constant contact with the outer circumference of the shaft.

4. The system of claim 1, wherein the grounding ring is formed of conductive material for grounding the grounding ring to a housing.

5. The system of claim 1, further comprising:
    a housing;
    a first shoulder positioned on the shaft, the first shoulder extending towards a central axis of the shaft to decrease an inner diameter across the shaft; and
    a base having a second shoulder that extends away from a central axis of the shaft to increase an inner diameter across the base.

6. The system of claim 5, wherein a rotating portion of the bearings is configured to be positioned adjacent to the first shoulder, and a stationary portion of the bearings is configured to be positioned adjacent to the second shoulder.

7. The system of claim 6, wherein the base is coupled to the housing, and the housing encompasses the stator.

8. The system of claim 1, wherein an inner circumference of the grounding ring includes brushes.

9. The system of claim 1, wherein the retention nut is configured to restrict lateral movement of the grounding ring and the bearings.

10. The system of claim 1, wherein the grounding ring is configured to divert a normal current flow path through the bearings to the preferred current flow path to ground.

11. A method associated with permanent magnet motor system, comprising:
    positioning permanent magnets on an outer circumference of the shaft between a proximal end of the shaft and a distal end of the shaft;

positioning a stator around the shaft;

positioning bearings around a distal end of the shaft, the bearings being positioned between the stator and a distalmost end of the shaft;

positioning a grounding ring adjacent to the bearings;

positioning a retention nut adjacent to the grounding ring; and providing a preferred current flow path associated with a voltage potential between the stator and the shaft to ground through the grounding ring.

12. The method of claim 11, wherein the current flow path does not flow through the bearings.

13. The method of claim 11, wherein an inner circumference of the grounding ring is in constant contact with the outer circumference of the shaft.

14. The method of claim 11, wherein the grounding ring is formed of conductive material for grounding the grounding ring to a housing.

15. The method of claim 11, further comprising:

forming a first shoulder on the shaft, the first shoulder extending towards a central axis of the shaft to decrease an inner diameter across the shaft; and forming a second shoulder on the base that extends away from a central axis of the shaft to increase an inner diameter across the base.

16. The method of claim 15, further comprising:

positioning a rotating portion of the bearings adjacent to the first shoulder, and positioning a stationary portion of the bearings adjacent to the second shoulder.

17. The method of claim 16, further comprising:

coupling the base to a housing, and the housing encompasses the stator.

18. The method of claim 11, wherein an inner circumference of the grounding ring includes brushes.

19. The method of claim 11, further comprising:

restricting lateral movement of the bearings and the grounding ring via the retention nut.

20. The method of claim 11, further comprising:

diverting a normal current flow path through the bearings to the preferred current flow path to ground via the grounding ring.

\* \* \* \* \*